United States Patent [19]

Brailsford et al.

[11] 3,928,055

[45] Dec. 23, 1975

[54] METHOD OF PREPARING A COATING COMPOSITION

[75] Inventors: Sidney Frank Brailsford, Maidstone; Donald Robson McDonald, Larkfield Green, both of England

[73] Assignee: Reed Paper Group Limited, London, England

[22] Filed: Aug. 25, 1971

[21] Appl. No.: 175,008

Related U.S. Application Data

[63] Continuation of Ser. No. 801,245, Feb. 19, 1969, abandoned.

[30] Foreign Application Priority Data

Feb. 16, 1968 United Kingdom................. 7818/68

[52] U.S. Cl................. 106/214; 127/71; 260/29.6 B
[51] Int. Cl.²............................................. C08L 3/00
[58] Field of Search...... 241/6, 8, 23, 65, 66, 46.15, 241/30; 260/29.6, 342; 106/210, 213; 127/71

[56] References Cited
UNITED STATES PATENTS

| | | | |
|---|---|---|---|
| 1,434,227 | 10/1922 | Ryan................................... | 106/148 |
| 2,641,557 | 6/1953 | Green................................. | 117/152 |
| 3,034,859 | 5/1962 | Gunn et al.......................... | 106/148 |
| 3,137,592 | 6/1964 | Protzman et al................. | 106/210 X |
| 3,630,774 | 12/1971 | Knight................................. | 127/71 |

OTHER PUBLICATIONS

Chem. Abst. 40:6939³ 1944.

*Primary Examiner*—Theodore Morris
*Attorney, Agent, or Firm*—Bacon & Thomas

[57] ABSTRACT

Method of preparing a coating composition comprising forming a slurry in an aqueous medium of a pigment and a starch and passing the slurry through a grinding apparatus, whereby the heat generated by the apparatus is used to supply some of the heat necessary to cook the starch before its discharge from the apparatus and the cooking and milling are effected in the apparatus.

2 Claims, No Drawings

METHOD OF PREPARING A COATING COMPOSITION

CROSS REFERENCE TO RELATED APPLICATION

This application is a continuation of U.S. application Ser. No. 801,245 filed Feb. 19, 1969, now abandoned.

The invention relates to a method of preparing a coating composition suitable for coating paper.

Paper to be used for printing is commonly given a smooth, glossy surface by coating it with a dispersion of a clay or other pigment in an aqueous medium containing a binder. The binder is suitably a starch or polyvinyl alcohol, which has been rendered soluble by a cooking treatment in the presence of water at 85°–95°. Such coating compositions have previously been made by one of two known methods. Either a clay is dispersed in water, starch is added, and the mixture is heated to cook the starch, or clay dispersed in water is added to pre-cooked starch. In both methods the clay is dispersed and the composition is rendered homogeneous by mechanical mixing, for example with a sigma blade mixer. The grade of clay employed is of great importance to the preparation of a satisfactory paper coating, and hitherto only high grade coating clays have been found to be fully suitable. The use of clays of larger particle size resulted in a less glossy coating.

It is an object of the invention to provide an improved method of preparing a coating composition suitable for coating paper.

According to the invention, a method of preparing a coating composition comprises forming a slurry in an aqueous medium of a pigment and an uncooked or partially cooked starch, and passing said slurry through a continuous agitation milling apparatus, for example of the sand grinding type, heat generated by said milling apparatus being used to supply at least some of the heat necessary to cook the starch before its discharge from said apparatus, and effecting cooking and milling in said apparatus. The term pigment includes materials suitable for coatings such as china clay, calcium carbonates and titanium dioxide.

Starches which may be used include converted grades, for example oxidised farina, hydroxyethylated farina, oxidised maize, or hydroxyethylated maize, as well as raw unconverted starches e.g. raw maize.

The process is so conducted that the starch is cooked before its discharge from the apparatus. The time and temperature necessary to effect this may readily be found by experiment; temperatures within the range of 85°–100°C are generally suitable.

According to a modification of the invention the starch is replaced by a hydrophilic binder which is initially insoluble in cold water but can be solubilized on heating. Such hydrophilic binders include polyvinyl alcohol.

According to one embodiment of the invention, the slurry is passed successively through a plurality of continuous agitation milling apparatus, of which a first one or more is thermally insulated, and a second one or more is heated to cook the starch passing through it; preferably a third one or more is cooled, suitably by an external water jacket.

The term continuous agitation milling apparatus indicates apparatus of the type commonly used in the paint industry for the grinding and dispersion of pigment in a liquid vehicle, and including apparatus using sand as well as substitutes therefor, such as glass, steel or plastics beads. Such apparatus is disclosed in British Patent Specification Nos. 686,234 and 810,005. In order to ensure good brightness of the product, a mill of which the internal parts are corrosion resistant is preferred.

The invention enables clays of inferior quality to be used for the preparation of paper coatings having satisfactory gloss. The gloss may be equivalent to coatings made from high quality clays by conventional methods.

Coating compositions according to the invention are of particular interest for the production of lightweight coated papers by reason of the good opacity and smoothness generally shown by the resultant coating.

The invention is illustrated in the following Example, wherein parts are by weight.

A slurry was prepared from 40 parts of water containing 0.12 parts of 'Dispex' dispersant (a sodium polyacrylate), 60 parts of Lemstar grade B (Lee Moor 24) clay and 3.6 parts of oxidised maize starch. The mixture was placed in a premixer vessel provided with a mechanical stirrer and was then pumped through a Sussmeyer SP.30 sand grinding apparatus at a rate of 33 imperial gallons/hour. The sand used was ottawa sand of 20–30 mesh conforming to A.S.T.M.(190. Without external heating, the mixture reached a temperature of 65°C as a result of the heat generated by the grinding operation. This was insufficient to cook the starch. When, however, steam was supplied to an external heating jacket the contents of the grinding apparatus were maintained at 95°C and the starch in the product was adequately cooked after a grinding time of 24–26 minutes.

Latex (Uniroyal 2752 — a latex of the styrene-butadiene type) was added to the product and it was coated on 80 grams per square meter base paper using a Dixon flooded nip coater. For comparison, the same paper was coated with a composition made from Dinkie A (English China Clays) high grade clay by conventional means.

| Clay | Coating wt. grams/sq metre. | Sheen gloss 45° | Smoothness Bentsen ml/min | Brightness Eel Z filter |
| --- | --- | --- | --- | --- |
| Lemstar B | 17.5 | 143.5 | 17 | 81.5 |
|  | 16.2 | 135.5 | 20 | 81 |
|  | 13.4 | 125.7 | 21 | 81 |
|  | 10.8 | 128.2 | 20 | 81.5 |
| Dinkie A | 20 | 167.5 | 15 | 83 |
|  | 16 | 152 | 19 | 84 |
|  | 14.5 | 142 | 21 | 83 |
|  | 12.5 | 127 | 32 | 83 |

In place of oxidised maize starch, raw maize can be used analogously.

We claim:

1. A method of preparing a coating composition which comprises:
   a. forming a slurry in an aqueous medium of a pigment selected from the group consisting of china clay, whiting and titanium dioxide, and an uncooked or partially cooked starch, and
   b. passing the slurry successively through a plurality of continuous agitation milling stages, using sand or glass, steel or plastic beads, whereby the heat generated by said continuous milling stages supplies some of the heat necessary to cook the starch and would raise the temperature of the slurry to about 65°C. without external heating before its discharge from the milling stages and wherein a first one or more of the continuous agitation milling stages is thermally insulated, and a second one or more of said stages is heated to a temperature of from about 85°C. to 100°C. to cook the starch passing therethrough.

2. A method as claimed in claim 1 in which a third one or more of said stages is cooled.

\* \* \* \* \*